(12) United States Patent
Alzahid et al.

(10) Patent No.: US 11,628,600 B2
(45) Date of Patent: Apr. 18, 2023

(54) FABRICATION METHOD OF TRANSPARENT 3D POLYDIMETHYLSILOXANE DEVICES WITH POLYCAPROLACTONE MOLDS

(71) Applicant: SAUDI ARABIAN OIL COMPANY, Dhahran (SA)

(72) Inventors: Yara Alzahid, Dammam (SA); Abdulkareem AlSofi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 9 days.

(21) Appl. No.: 17/326,741

(22) Filed: May 21, 2021

(65) Prior Publication Data

US 2022/0371228 A1    Nov. 24, 2022

(51) Int. Cl.
| | | |
|---|---|---|
| *B29C 33/38* | (2006.01) | |
| *B33Y 10/00* | (2015.01) | |
| *B33Y 40/00* | (2020.01) | |
| *B33Y 70/00* | (2020.01) | |
| *B33Y 80/00* | (2015.01) | |
| *B29C 64/364* | (2017.01) | |
| *B29C 33/40* | (2006.01) | |
| *B29K 83/00* | (2006.01) | |
| *B29L 31/00* | (2006.01) | |

(52) U.S. Cl.
CPC ...... *B29C 33/3814* (2013.01); *B29C 33/3842* (2013.01); *B29C 33/40* (2013.01); *B29C 64/364* (2017.08); *B33Y 10/00* (2014.12); *B33Y 40/00* (2014.12); *B33Y 70/00* (2014.12); *B33Y 80/00* (2014.12); *B29K 2083/00* (2013.01); *B29K 2867/046* (2013.01); *B29L 2031/757* (2013.01)

(58) Field of Classification Search
CPC .. B29C 33/3814; B29C 33/3842; B29C 33/40
See application file for complete search history.

(56) References Cited

U.S. PATENT DOCUMENTS

| | | |
|---|---|---|
| 6,730,252 B1 | 5/2004 | Teoh et al. |
| 2016/0107385 A1 | 4/2016 | Takahashi et al. |
| 2016/0136895 A1 | 5/2016 | Beyer et al. |
| 2020/0018442 A1 | 1/2020 | Loukus et al. |

FOREIGN PATENT DOCUMENTS

| | | |
|---|---|---|
| WO | 2017/112751 A1 | 6/2017 |
| WO | 2017/116990 A1 | 7/2017 |

OTHER PUBLICATIONS

International Search Report issued in PCT/US2022/027307, dated Sep. 9, 2022 (5 pages).
Written Opinion of the International Searching Authority issued in PCT/US2022/027307, dated Sep. 9, 2022 (10 pages).
Lee, Dongkeon et al., "3D replication using PDMS mold for microcoil"; Microelectronic Engineering; vol. 86, Issues 4-6; pp. 920-924; Apr.-Jun. 2009 (5 pages).
Hwang, Yongha et al., "3D printed molds for non-planar PDMS microfluidic channels"; Sensors and Actuators A: Physical; vol. 226; pp. 137-142; May 1, 2015 (6 pages).

*Primary Examiner* — James Sanders
(74) *Attorney, Agent, or Firm* — Osha Bergman Watanabe & Burton LLP (57) ABSTRACT

A method of forming a model of a porous structure includes three dimensionally printing a mold of the porous structure using a polycaprolactone mold material, filling the mold with a polymer mixture, and heating the filled mold at a temperature above a melting temperature of the mold material to cure the polymer mixture, where the cured polymer mixture forms the model of the porous structure.

17 Claims, 5 Drawing Sheets

FABRICATION METHOD OF TRANSPARENT 3D POLYDIMETHYLSILOXANE DEVICES WITH POLYCAPROLACTONE MOLDS

BACKGROUND

In the oil and gas industry, a well may be drilled through an earthen formation to reach a hydrocarbon reservoir (e.g., oil and gas reservoir), which may be generally composed of porous and permeable rock containing the hydrocarbon resources in its pores. During production, hydrocarbons from the reservoir may flow through the porous rock to be produced through the well. Great efforts are made during the planning, drilling, and production phases of the well to assure maximization of hydrocarbon recovery and minimization of costs. For example, well models are heavily used for production optimization, and may include simulations of the formation and reservoir through which a well is drilled. There are many different types of tools used in modeling a formation, including, for example, computer simulations and physical rock samples of the formation, which may be tested in the lab or downhole as a well is being drilled.

Modeling may also include a focus on how hydrocarbon fluids within the microscopic spaces of porous reservoir sedimentary rocks flow to the wellbore for extraction during production. Accurate quantification of such microscopic spaces is essential to understand the rock storage capacity and ability for the fluids to flow during production operations. These spaces consist of microscopic and interconnected pores that are formed during deposition and subsequently modified by diagenesis. Methods based on geometry and/or capillary pressures are often used to measure the pore size distribution in porous reservoir sedimentary rocks.

Modeling fluid flow through a rock formation may be used to provide improved production procedures and fluid behavior predictions from a well, which may be used to optimize the overall production of a well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to methods of forming a model of a porous structure that include three dimensionally printing a mold of the porous structure using a polycaprolactone mold material, filling the mold with a polymer mixture, and heating the filled mold at a temperature above a melting temperature of the mold material to cure the polymer mixture, wherein the cured polymer mixture forms the model of the porous structure.

In another aspect, embodiments of the present disclosure relate to methods that include three dimensionally printing a mold of a porous structure using a polycaprolactone mold material, filling the mold with a polymer mixture of polydimethylsiloxane and a curing agent having a ratio of polydimethylsiloxane to curing agent ranging from 14:1 to 7:1, heating the filled mold at a first temperature for at least 4 hours to solidify the polymer mixture, wherein the first temperature is lower than a melting temperature of the mold material, heating the filled mold at a second temperature greater than the melting temperature of the mold material to melt the mold, and removing the melted mold material from the solidified polymer mixture to provide a model of the porous structure.

In yet another aspect, embodiments of the present disclosure relate to mold assemblies that include a polycaprolactone mold of a porous structure, wherein the mold of the porous structure is formed of a plurality of bulbs connected together by a plurality of stems, and a polymer mixture having monomers of polydimethylsiloxane and a curing agent in a ratio of polydimethylsiloxane to curing agent of about 10:1, wherein the mold of the porous structure is submersed in the polymer mixture.

Other aspects and advantages of the claimed subject matter will be apparent from the following description and the appended claims.

DETAILED DESCRIPTION

In one aspect, embodiments disclosed herein generally relate to methods of printing a polymer mold and using the mold to make a transparent model of porous rock. The transparent models of porous rock may be used to study fluid flow through the porous rock, which may provide improved understanding of larger fluid flow behavior in formations containing such porous rock. For example, methods of the present disclosure may be used to model porous rocks such as sandstone, shale, limestone, rocks having a porosity of at least 10 percent, and other rocks of interest.

According to embodiments of the present disclosure, a mold of a porous structure may be made using polycaprolactone (PCL) as the mold material. The mold of the porous structure may be designed to replicate the negative of a microstructure of a porous rock, including, for example, the porosity of the rock and the sizes and shapes of typical pores found within the rock. Replication of a porous rock microstructure, which often includes very small pore structures (e.g., of a micrometer scale), may be achieved by printing the mold using additive manufacturing techniques. Once the mold is formed, the mold may be filled with a polymer mixture, for example, polydimethylsiloxane (PDMS) or other transparent polymer mixture. The filled mold may then be heated to a temperature above the melting temperature of the mold material, which may cure the polymer mixture and melt the mold material. When the mold material is melted and removed from the cured polymer mixture, the cured polymer mixture may form a model of the porous structure. Forming the model with a transparent polymer material may allow visualization of fluid flow through the porous rock model. Thus, embodiments disclosed herein may provide a micro-scale visualization platform of porous rock using PCL molds built by additive manufacturing.

Additive manufacturing (also referred to as three-dimensional (3D) printing) is a layer-based manufacturing technique that includes building a three-dimensional structure by successively applying layers of a material over each other. For example, when building a structure using 3D printing, a first layer of material may be applied over a substrate in a pattern of an outer surface or cross-section of the structure being printed. A second layer of the same or different material may be applied over the first layer of material in either the same or a varying pattern. In such manner, additional subsequent layers of same or different material may be successively layered over the first and second layers until the structure is built (formed of the multiple sequential material layers).

The pattern of each layer that is applied by 3D printing may be taken from multiple successive and parallel cross-sections of a computer-generated 3D design of a mold according to embodiments of the present disclosure. In other words, cross-sectional slices of the computer-generated design may provide the pattern for each layer that is 3D printed to form the mold. The multiple parallel cross-sections of the computer-generated design may be taken at a cross-section interval (thicknesses) along the computer-generated design according to the 3D printed layer thickness. According to embodiments of the present disclosure, the cross-section interval of a computer-generated design may correspond to a desired resolution of the 3D printed mold, or to the resolution of the 3D printing capabilities. For example, when a 3D printing machine is limited to printing a material at a thickness no smaller than 10 micrometers, the cross-section interval of the computer-generated design and resolution of the 3D printed mold may be selected to be 10 micrometers or greater.

Figure 1:
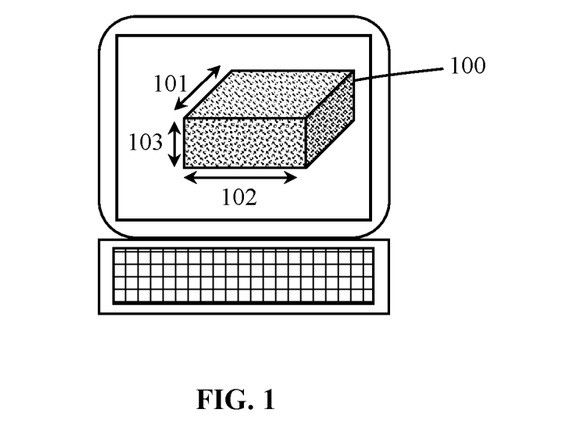
FIG. 1 shows an example of a computing system in accordance with embodiments of the present disclosure.
Figure 2:
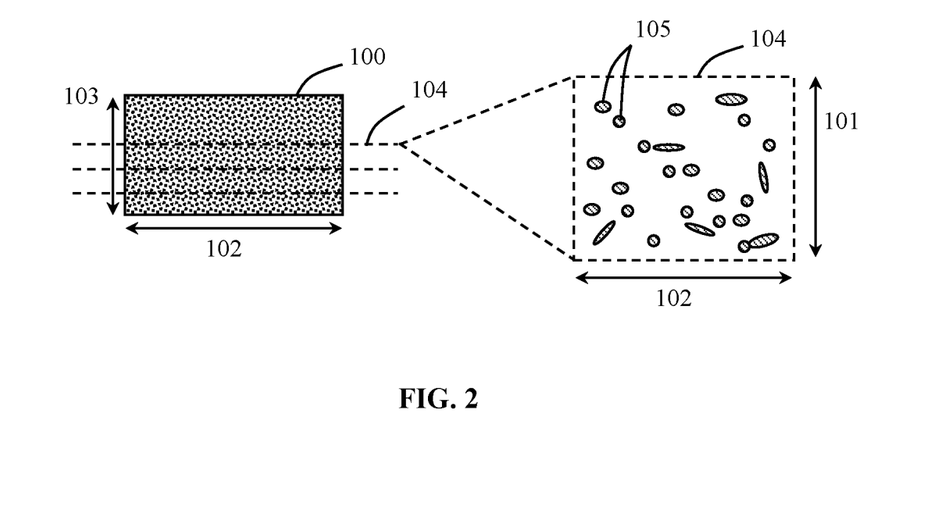
FIG. 2 shows a computer-generated design of a mold in accordance with embodiments of the present disclosure.
Figure 3:
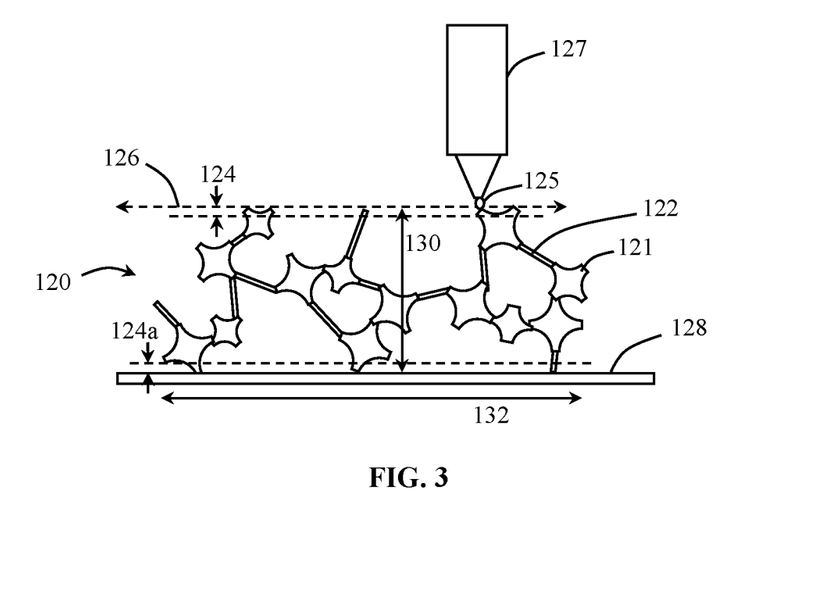
FIG. 3 shows in accordance with embodiments of the present disclosure.

FIGS. 1-3 show an example of a method of forming a mold according to embodiments of the present disclosure using 3D printing. As shown in FIG. 1, a computer-generated 3D design 100 of a mold may have a length 101, width 102, and thickness 103. The computer-generated design 100 may be made using a computing system 110 and computer-aided design software, such as AutoCAD®, Rhino®, or SolidWorks®. The computer-generated design 100 may be generated based on simulations of a porous rock. For example, the microstructure of a porous rock may be analyzed using one or more tools, such as imaging equipment (e.g., microscopes, photolithography equipment, a scanning electron microscope (SEM), nuclear magnetic resonance (NMR) and magnetic resonance imaging (MRI) tools, x-ray computerized tomography (CT), and other spectroscopy instruments) and weight and volume analysis tools (e.g., a scale). Computer-aided imaging software may be used to replicate the microstructure of a porous rock based on the porous rock analysis. A negative of the porous structure may then be designed using a computer modeling program, which may be the same computer-aided imaging software used to replicate the porous rock microstructure, or a different software program. As used herein, a rock microstructure may refer to the arrangement, size, shape, and other physical characteristics of the rock particles forming the rock, while the negative of a microstructure may refer to the negative spaces (e.g., pores) formed within the rock microstructure. The design of the microstructure negative may be used as the computer-generated design of the mold, shown as the computer-generated design 100 in FIG. 1.

As shown in FIG. 2, once the computer-generated design 100 of a mold is made, multiple successive cross-sections 104 may be taken at cross-section intervals along the thickness 103 of the computer-generated design 100. The cross-sections 104 may provide the pattern of each layer to be printed for 3D printing the mold. Cross-sections 104 may be taken at equal or different cross-section intervals. Further, cross-sections may extend along cross-sectional planes intersecting the length 101 and width 102 of the computer-generated design 100, as shown in FIG. 2, or may extend in a parallel manner along a different orientation through the computer-generated design to provide patterns for successive layers applied in a 3D printing process.

In the example shown in FIG. 2, a cross-section 104 of the computer-generated design 100 includes a plurality of spaced-apart material areas 105. As the computer-generated design 100 may replicate a negative of a rock microstructure, the material areas 105 may represent locations of negative space (e.g., pores) within the rock microstructure along the cross-section 104.

As shown in FIG. 3, patterns of successively taken cross-sections 104 of the computer-generated design 100 may be printed as corresponding successive layers 124 to form the mold 120 of a porous structure. Each printed layer 124 may include mold material 125 applied along a plane 126 in the same pattern as the corresponding cross-section 104 material area pattern. For example, mold material 125 may be applied on a substrate 128 in a pattern corresponding with a cross-section along a base surface of the computer-generated design 100 to form a first layer 124a of the mold 120. A second layer, third layer, and so on may be successively applied over the first layer 124a in patterns corresponding with adjacent cross-sections of the computer-generated design 100 to build the mold 120. The mold material 125 may be applied through one or more nozzles 127 of a 3D printing device.

According to embodiments of the present disclosure, the mold material 125 may include PCL (polycaprolactone) or other polymer having a melting temperature greater than about 50° C., e.g., a melting temperature ranging from about 60° C. to about 80° C. PCL is a biodegradable polyester with a low melting point of around 60° C. and a glass transition temperature of about −60° C. Because PCL has a relatively lower melting temperature when compared with other conventional 3D printing materials (e.g., polylactic acid (PLA) or acrylonitrile butadiene styrene (ABS)), PCL may be 3D printed while also being able to melt away from an adjacent polymer mixture filling material without destroying the polymer mixture. PCL may be provided as a filament to be 3D printed. Additionally, mold material 125 may have a composition that is entirely PCL (100 wt % PCL) or close to 100 wt % PCL.

The patterns of the applied layers 124 may successively build a plurality of interconnected bulbs 121 and stems 122 of mold material 125. The bulbs 121 and stems 122 may replicate negative spaces within a porous rock microstructure. For example, bulbs 121 may be printed to have general sizes and shapes of pores in a porous rock and stems 122 may be printed to have general sizes and shapes of pore throats in the porous rock. As such, bulbs 121 may be 3D printed to have a diameter greater than the stems 122, e.g., bulbs 121 may have a diameter less than 1 mm, and the stems 122 may have a diameter less than the bulb diameter. Depending on the porous structure being modeled, mold material may be 3D printed in different sizes and shapes to correspond with negative spaces formed within the porous structure. By using 3D printing to form the mold 120, a porous space having irregular shapes (e.g., such as the bulbs 121 and stems 122 shown in FIG. 3) may be more accurately replicated when compared with subtractive manufacturing processes. However, in some embodiments, porous spaces having other shapes, such as symmetrical, smooth, or uniform shapes, may also be made using 3D printing.

Further, according to embodiments of the present disclosure, a mold may be 3D printed to replicate a porosity of a porous structure. For example, as shown in FIG. 3, the mold 120 may be 3D printed as a three-dimensional structure having a total volume defined by a height 130 measured from the first layer printed to the last or final layer printed, a length 132 measured between the farthest apart points printed along a length dimension, and a depth (not labeled, extending along the dimension into/out of the page) measured between the farthest apart points printed along a depth dimension that is perpendicular to both the height 130 and the length 132. The amount of printed mold material 125 within the total volume of the mold 120 may replicate the porosity of a porous structure being modeled. For example, the plurality of interconnected bulbs 121 and stems 122 of the mold 120 may form less than 40 percent by volume of the mold, which may be used to form a model of a porous structure having a corresponding porosity of 40 percent or less.

In some embodiments, a mold may be used to replicate effective porosity in a porous structure. As used herein, effective porosity may refer to fluidly connected porosity in a porous structure (i.e., porous spaces within the porous structure that are fluidly connected), exclusive of isolated pore spaces (i.e., isolated porous spaces within the porous structure that are not fluidly connected with any surrounding porous space). Thus, in molds of effective porosity in a porous structure, the mold may not replicate isolated porous space in the porous structure. In such cases, the effective porosity recreated by a mold of a porous structure may be less than an actual total porosity of the porous structure. For example, when modeling a porous structure having both fluidly connected porous spaces and discontinuous or isolated porous spaces, a mold may recreate the portion of the porous structure porosity that is fluidly connected, such that the mold recreates an effective porosity less than the total porosity of the porous structure. In some embodiments, a mold may be used to create a model of a porous structure having an effective porosity of less than 40 percent by volume.

Once a mold has been made of a porous structure, the mold may be used to form a model of the porous structure. For example, according to embodiments of the present disclosure, a model of a porous rock may be formed by 3D printing a mold of the porous rock, such as described above, filling the mold with a polymer mixture, and heating the filled mold at a temperature above a melting temperature of the mold material to cure the polymer mixture, wherein the cured polymer mixture forms the model of the porous rock. In some embodiments, heating a filled mold may be a two-stage process that includes 1) heating the filled mold at a first temperature for a duration to solidify the polymer mixture, wherein the first temperature is lower than a melting temperature of the mold material, and 2) heating the filled mold at a second temperature greater than the melting temperature of the mold material to melt the mold. When the mold material is melted, the melted mold material may be removed from the solidified polymer mixture, leaving the model of the porous structure with empty porous spaces where the mold used to be.

Figure 4A:
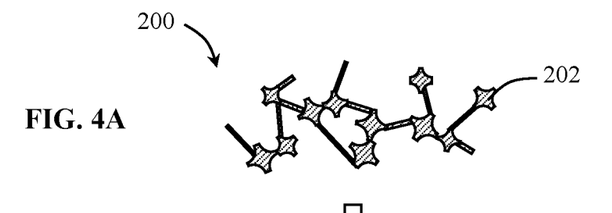
FIGS. 4A-D show a method of forming a model of a porous structure in accordance with embodiments of the present disclosure.

FIGS. 4A-D show an example of a method of forming a model of a porous structure according to embodiments of the present disclosure. As shown in FIG. 4A, a three-dimensional mold 200 of the porous structure may be 3D printed (e.g., using methods shown and described with respect to FIGS. 1-3). The mold 200 may be formed of PCL and may have a shape corresponding to fluidly linked spaces within the porous structure. For example, the mold 200 may have a web-like structure of interconnected irregular shapes of mold material 202, which may correspond with or replicate the porous space within the porous structure.

Figure 4B:
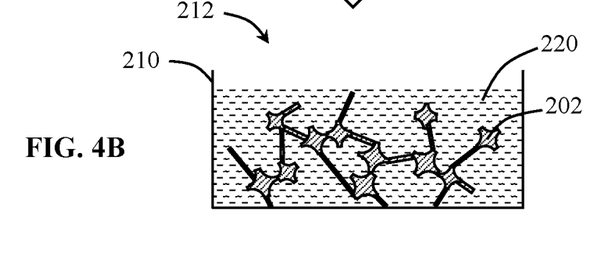

As shown in FIG. 4B, the mold 200 may be placed in a container 210, such as a petri dish, or other glass or plastic cup or container. A polymer mixture 220 may then be poured over the mold 200 and within the container 210 to provide a filled container assembly 212. The polymer mixture 220 may be poured in an amount sufficient to entirely submerse the mold 200.

The filled container assembly 212 (containing the mold 200 submersed in and filled with the polymer mixture 220) may then be heated to cure the polymer mixture 220 and melt the mold 200. The heating process may include putting the filled container assembly 212 in an oven to heat the filled container assembly 212 according to a preselected heating schedule, which may include heating the filled container assembly 212 under a first temperature to solidify the polymer mixture 220 and then heating the assembly under a second temperature greater than the first temperature to melt the mold 200.

Figure 4C:
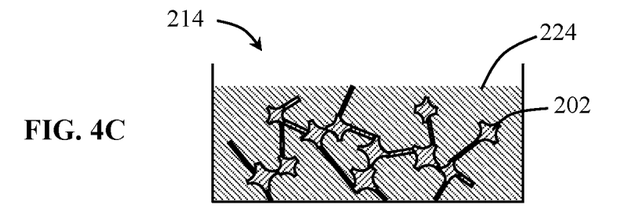

For example, as shown in FIG. 4C, the filled container assembly 212 may be heated under a first temperature that is equal to or greater than the curing temperature the polymer mixture 220 and below the melting temperature of the mold material 202. The polymer mixture 220 may be heated under the first temperature for a duration sufficient to cure the polymer mixture and form a cured polymer mixture 224. The cured polymer assembly 214, including the mold 200 surrounded by the cured polymer mixture 224, may be removed from the container 210 or may remain in the container 210.

Figure 4D:
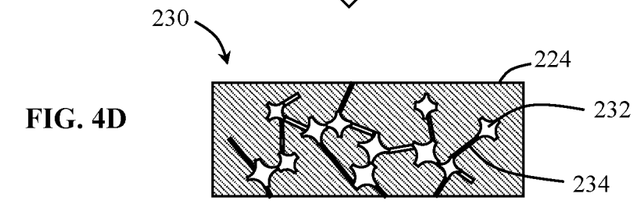

As shown in FIG. 4D, the cured polymer assembly 214 may then be heated to a second temperature that is greater than the first temperature and at least equal to the melting temperature of the mold material 202. The cured polymer assembly 214 may be heated under the second temperature for a second duration sufficient to melt the mold material 202, while the cured polymer mixture 224 may remain intact.

Melted mold material 202 may be removed from the cured polymer mixture 224, for example, by allowing the melted mold material to flow through the passageways formed through the cured polymer mixture by the mold or using vacuum pressure. In some embodiments, the cured polymer mixture 224 may be flipped upside down to allow the melted mold material to flow out of the cured polymer mixture 224. When the melted mold material is removed from the cured polymer mixture 224, the cured polymer mixture forms the model of the porous structure 230 having a system of porous spaces 232, 234 where the mold 200 used to be. For example, the spaces formed within the model of the porous structure 230 may include interconnected larger spaces representing pores 232 in the porous structure and relatively smaller spaces representing pore throats 234 in the porous structure.

According to embodiments of the present disclosure, a polymer mold material 202 and polymer mixture 220 for the model may be selected based on the relative melting, curing, and degradation temperatures of the two materials. For example, a polymer mold material may be selected based on its ability to be 3D printed and its melting temperature, where the selected polymer mold material has a melting temperature that is greater than the curing temperature of a selected polymer mixture and less than the degradation temperature of the selected polymer. Likewise, a polymer mixture for the model may be selected based on its transparency and its curing and degradation temperatures, where the curing temperature is lower than the melting temperature of the selected mold material and the degradation temperature is greater than the melting temperature of the selected mold material. In such manner, the mold material may be selected to have a melting temperature that is greater than a curing temperature of a polymer mixture that fills the mold, such that the mold material does not melt prior to hardening the polymer mixture. Additionally, a polymer mold material may be selected to have a melting temperature that is less than a degradation temperature of the cured polymer mixture formed around the mold, such that the mold material may melt without degrading the cured polymer mixture.

For example, according to embodiments of the present disclosure, a polymer mixture 220 may include monomers of PDMS and a curing agent. A ratio of PDMS to curing agent of the polymer mixture 220 may range from 15:1 to 6:1, e.g., 10:1. In some embodiments, a polymer mixture may be made of a different type of transparent polymer having a degradation temperature greater than the melting temperature of the mold material 202 and a curing temperature lower than the melting temperature of the mold material 202. By using a transparent polymer mixture 220, the model of the porous structure 230 formed by the polymer mixture 220 may also be transparent, thereby allowing visualization of fluid flow through the porous structure.

In embodiments using a PCL mold and PDMS polymer mixture, a filled container assembly including the PCL mold submersed in the PDMS polymer mixture may be heated to a first temperature ranging between about 35° C. and 45° C. and held for a duration of greater than 4 hours and then heated to a second temperature greater than about 75° C. For example, a filled container assembly including a PCL mold submersed in a PDMS polymer mixture may be heated to a first temperature of about 40° C. for between 4 and 6 hours and then heated to a second temperature of about 80° C. Because PCL has a melting temperature of about 59-60° C., the PDMS polymer mixture may solidify and form the fully cured polymer mixture before the PCL mold material begins to melt. Thus, solidified passageways defining porous spaces throughout the model may be fully formed in the cured PDMS polymer mixture before the mold material melts and is removed.

Figure 5:
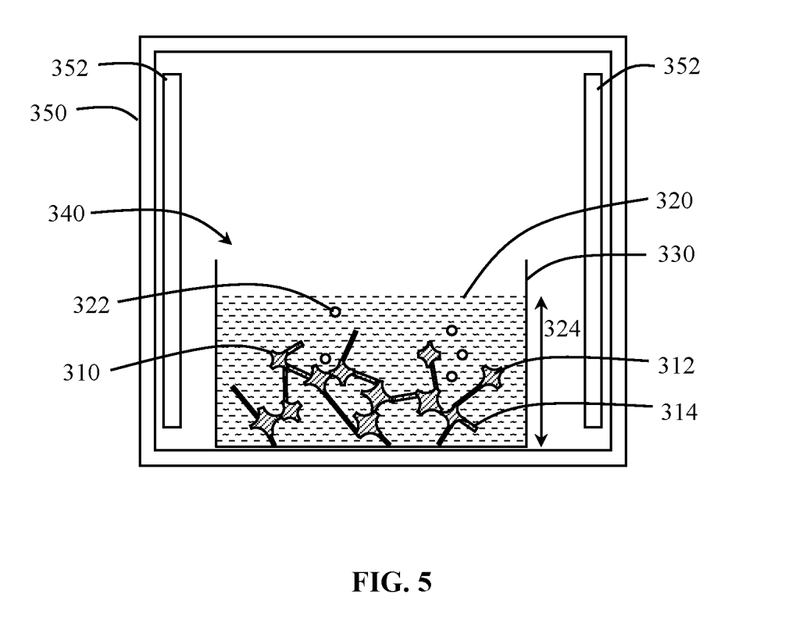
FIG. 5 shows a method of forming a model of a porous structure in accordance with embodiments of the present disclosure.

Referring now to FIG. 5, FIG. 5 shows another example of a system and method according to embodiments of the present disclosure to form a model of a porous structure. As shown, a mold assembly 300 according to embodiments of the present disclosure may include a mold 310 of a porous structure. The mold 310 may include a plurality of bulbs 312 connected together by a plurality of stems 314. When such molds 310 are used with methods disclosed herein, the bulb 312 portions of the mold 310 may be used to form pores in the porous structure, and the stem 314 portions of the mold 310 may be used to form pore throats in the porous structure. According to embodiments of the present disclosure, the mold 310 may be made entirely of PCL (e.g., a composition having about 90-100 percent by volume PCL).

The mold 310 may be submersed in the polymer mixture 320, where the mold 310 and polymer mixture 320 are held in a container 330. According to embodiments of the present disclosure, the polymer mixture 320 may have a composition of PDMS and a PDMS curing agent in a ratio of PDMS to curing agent ranging from 14:1 to 7:1.

After the polymer mixture 320 is poured over the mold 310 to fill the mold 310, a vacuum pressure may be applied to the filled mold for a duration to remove air bubbles 322 from the mold 310. For example, the filled container assembly 340 (including the container 330 holding the mold 310 submersed in the polymer mixture 320) may be placed in a vacuum chamber 350, where vacuum pressure may be applied to remove air bubbles 332 from the filled container assembly 340. According to embodiments of the present disclosure, vacuum pressure may be applied until the polymer mixture 320 fills at least 90% of the mold 310, at least 95% of the mold 310, or at least 98% of the mold 310. The volume of polymer mixture 320 that fills the mold 310 may be monitored, for example, by measuring changes in the depth 324 of the polymer mixture 320 in the container 330, where a reduction in polymer mixture depth 324 in the container 330 may indicate displacement of air with polymer mixture 320, i.e., that more volume in the mold 310 has been filled with the polymer mixture 320.

After air has been removed from the filled container assembly 340 may be heated to a first temperature for a duration to solidify the polymer mixture 320. In some embodiments, the vacuum chamber 350 may also have one or more heating elements 352 positioned around the vacuum chamber 350 to uniformly heat the filled container assembly 340. In some embodiments, after removing air bubbles from the filled container assembly 340, the filled container assembly 340 may be moved from the vacuum chamber 350 to a separate oven to heat the filled container assembly. The filled container assembly 340 may be heated according to a preselected heating schedule that first cures the polymer mixture 320, and after the polymer mixture 320 is fully cured, melts the mold 310. A heating schedule may include steadily increasing the temperature around the filled container assembly 340 (e.g., increasing the temperature at a constant rate or interval) or discontinuously increasing the temperature around the filled container assembly 340 (e.g., at an irregular interval). For example, a heating schedule may include heating the filled container assembly 340 to a first temperature (e.g., to a temperature less than 50° C.) and held at the first temperature for at least 4 hours to solidify the polymer mixture 320. The heating schedule may then include heating the assembly to a second temperature greater than the melting temperature of the mold material (e.g., greater than 75° C.) to melt the mold 310. The melted mold material may be removed from the solidified polymer mixture, where the solidified polymer mixture may be cooled back to room temperature to provide a model of the porous structure.

According to embodiments of the present disclosure, after melted mold material is removed from a solidified polymer mixture, excess polymer mixture material may be removed to form a model of a porous structure.

Figure 6A:
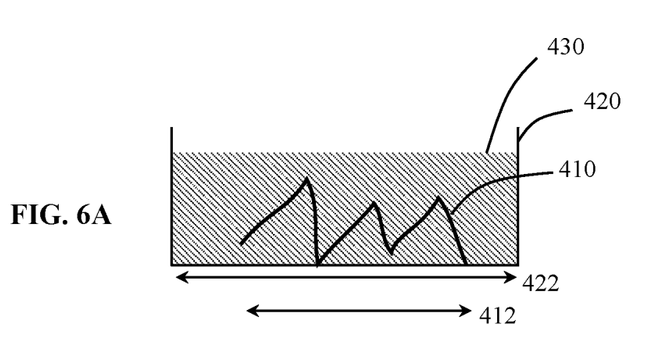
FIGS. 6A and 6B show a method of forming a model of a porous structure in accordance with embodiments of the present disclosure.

For example, as shown in FIG. 6A, a mold 410 may be placed in a container 420 having at least one dimension 422 that is greater than a dimension 412 of the mold 410 (e.g., the container may have a longer length and longer depth than the mold). When a polymer mixture 430 is poured over the mold 410 to fill the mold 410, the polymer mixture 430 may flow around the sides of the mold 410, filling the space within the container 420 between the container wall and the outer dimensions of the mold 410. Further, the polymer mixture 430 may be poured over the mold 410 in an amount sufficient to entirely cover the mold 410 and then some, such that the mold 410 may be submersed a depth below a top surface of the polymer mixture 430.

Figure 6B:
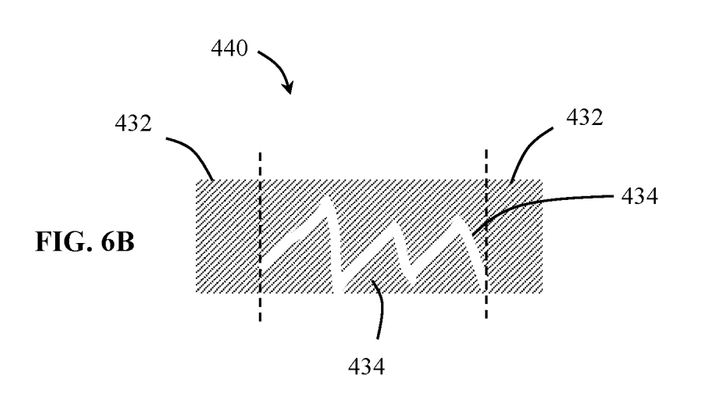

When the polymer mixture 430 fills a volume greater than the volume of the mold 410, excess of the cured polymer mixture may be formed after heating to cure the polymer mixture 430 and melt the mold 410. As shown in FIG. 6B, the excess 432 of the cured polymer mixture 434 may be removed (e.g., by cutting) to form the model of the porous structure 440, such that at least two openings to the formed pore structure 436 are exposed around the outer surfaces of the porous structure 440. For example, excess 432 of the cured polymer mixture 434 may be removed such that openings to the formed pore structure 436 are provided at opposite outer surfaces of the porous structure 440, as shown in FIG. 6B.

After a model of a porous structure has been formed according to methods disclosed herein, a fluid may be flowed through the model of the porous structure. Because the model of the porous structure may be formed of a transparent polymer mixture, such as described above, the fluid flow through the model may be viewed through the transparent volume of the porous structure model. Fluid flowed through a model of a porous structure according to embodiments of the present disclosure may be a test fluid of a single composition (e.g., water), a mixed fluid having multiple components or multiple phases (e.g., a mixture of a gas and liquid). For example, a test fluid may be selected from at least one of a hydrocarbon fluid, carbon dioxide, water, and mixtures thereof.

According to embodiments of the present disclosure, a test fluid may be selected based on the end applications being studied. For example, in some embodiments, a porous structure in a reservoir may be modeled to study fluid flow through the reservoir during enhanced oil recovery (EOR) processes. Because reservoir formations may often have complex pore structures, methods and systems disclosed herein may allow for an improved visualization platform of the reservoir rock, which may be used to better understand multiphase flow through the reservoir from EOR (e.g., from oil snap-off, the oil recovery phase, etc.) For example, simulating EOR fluid flow through a porous formation with models and methods according to embodiments of the present disclosure may provide fluid flow analysis that allows optimization of EOR slugs and injection strategies, thereby optimizing overall production of the well.

Models of porous structures made according to embodiments of the present disclosure may be used to study fluid flow (e.g., including multiphase fluid flow) through rocks or other porous structures in other applications, including other oil and gas applications.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:
   three dimensionally printing a mold of a porous structure using a mold material, wherein the mold material comprises polycaprolactone;
   filling the mold with a polymer mixture; and
   heating the filled mold at a temperature above a melting temperature of the mold material to cure the polymer mixture, wherein the cured polymer mixture forms a model of the porous structure.

2. The method of claim 1, wherein the polymer mixture comprises monomers of polydimethylsiloxane and a curing agent.

3. The method of claim 2, wherein a ratio of polydimethylsiloxane to curing agent ranges from 15:1 to 6:1.

4. The method of claim 1, further comprising designing a negative of the porous structure using a computer modeling program, wherein the design of the negative is printed to form the mold.

5. The method of claim 1, wherein filling the mold with the polymer mixture comprises:
   placing the mold in a container; and
   filling the container with the polymer mixture until the mold is submersed in the polymer mixture.

6. The method of claim 1, wherein filling the mold with the polymer mixture comprises:
   placing the mold in a container;
   pouring the polymer mixture over the mold to fill the mold with the polymer mixture; and
   applying a vacuum pressure to the filled mold for a duration to remove air bubbles from the mold.

7. The method of claim 6, wherein the vacuum pressure is applied until the polymer mixture fills at least 90% of the mold.

8. The method of claim 1, wherein heating the filled mold comprises:
   heating at a first temperature to solidify the polymer mixture; and
   heating at a second temperature greater than the first temperature to melt the mold.

9. The method of claim 8, wherein the first temperature ranges between 35° C. and 45° C. and is held for a duration greater than 4 hours, and the second temperature is greater than 75° C.

10. The method of claim 1, further comprising removing an excess of the cured polymer mixture to form the model of the porous structure.

11. The method of claim 1, further comprising flowing a fluid through the model of the porous structure, wherein the fluid comprises at least one of a hydrocarbon fluid, carbon dioxide, and water.

12. The method of claim 1, wherein the mold comprises a plurality of bulbs interconnected by a plurality of stems, and wherein after heating the filled mold above the melting temperature, the bulbs melt away to leave pores in the model of the porous structure, and stems melt away to leave pore throats in the model of the porous structure.

13. The method of claim 12, wherein the bulbs have a diameter less than 1 mm, and wherein the stems have a diameter less than the bulb diameter.

14. A method, comprising:
   three dimensionally printing a mold of a porous structure using a mold material, wherein the mold material comprises polycaprolactone;
   filling the mold with a polymer mixture of polydimethylsiloxane and a curing agent having a ratio of polydimethylsiloxane to curing agent ranging from 14:1 to 7:1; and
   heating the filled mold at a first temperature for at least 4 hours to solidify the polymer mixture, wherein the first temperature is lower than a melting temperature of the mold material;
   heating the filled mold at a second temperature greater than the melting temperature of the mold material to melt the mold; and removing the melted mold material from the solidified polymer mixture to provide a model of the porous structure.

15. The method of claim 14, wherein the first temperature ranges between 35° C. and 45° C., and the second temperature is greater than 75° C.

16. The method of claim 14, wherein the mold of the porous structure comprises a plurality of interconnected bulbs having a diameter of less than 1 mm.

17. The method of claim 14, wherein the model of the porous structure has an effective porosity of less than 40 percent by volume.

* * * * *